Aug. 6, 1968
G. GEIER
3,395,607
STAR AND SKY SIMULATOR
Filed March 23, 1964
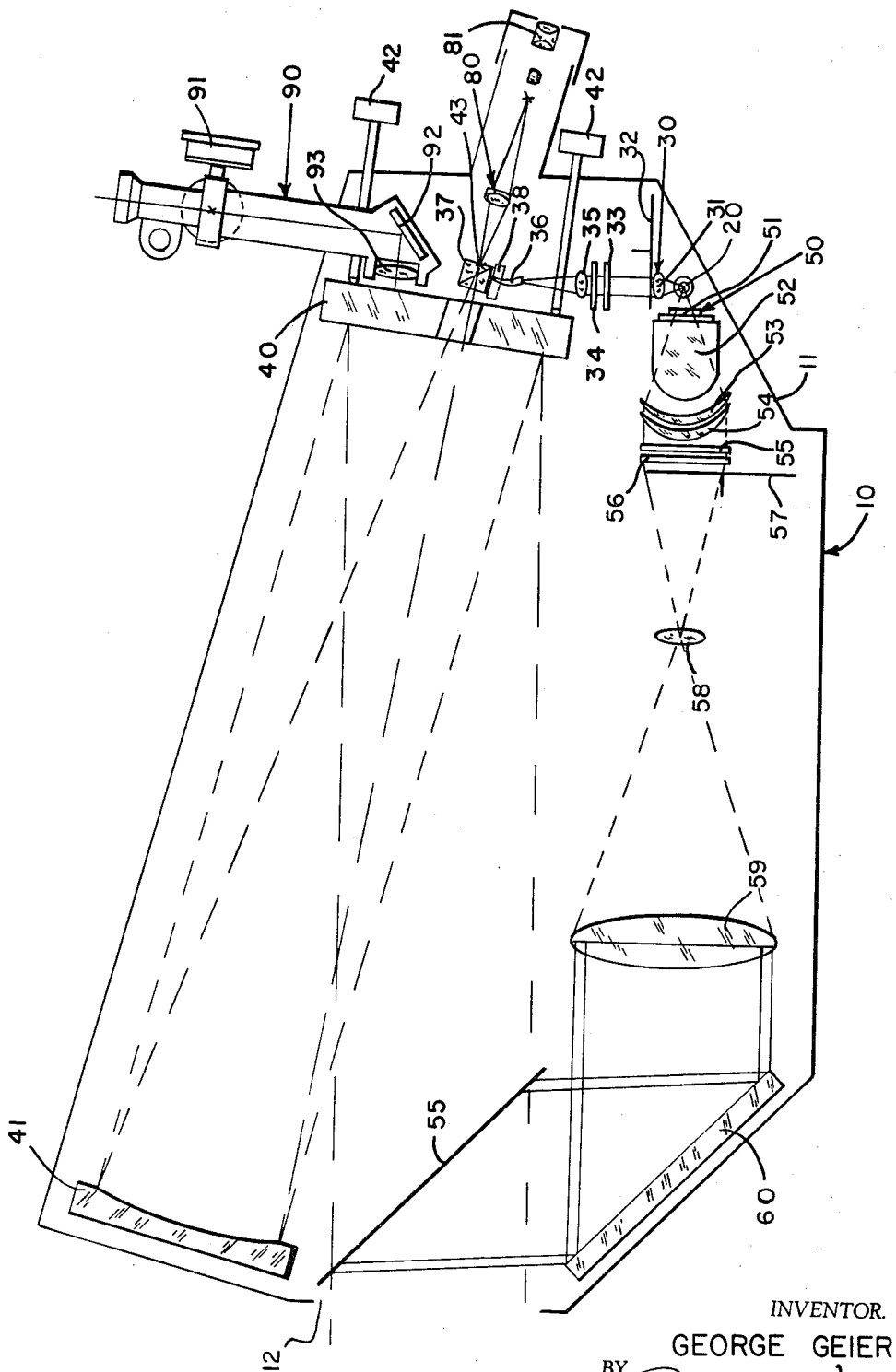
INVENTOR.
GEORGE GEIER
BY
ATTORNEY

United States Patent Office 3,395,607
Patented Aug. 6, 1968

3,395,607
STAR AND SKY SIMULATOR
George Geier, Teaneck, N.J., assignor to Keuffel & Esser
Company, Hoboken, N.J., a corporation of New Jersey
Filed Mar. 23, 1964, Ser. No. 353,737
4 Claims. (Cl. 88—14)

ABSTRACT OF THE DISCLOSURE

A star and sky simulator is provided for faithfully reproducing natural variations in the ratio of starlight to skylight brightnesses and includes the separate optical systems for projecting light from a single light source and individually simulating the collimated light of a star and the diffused light of the sky. The light beams projected from the two optical systems are combined into a composite light beam which constitutes the test medium to evaluate the accuracy of star tracking devices or the like. By use of selected wave length filters and variable light intensity attenuators in the separate optical systems, accurate reproduction of starlight and skylight may be produced and brightness ratios of these lights may be varied over a broad range.

---

The present invention relates to star and sky simulators, and refers more particularly to means for changing the position of a simulated star by small measurable angles.

Until very recently, man had no particular need for simulating starlight and skylight by means of a radiant energy source of suitable spectral range and intensity. However, the recent advance of various disciplines of science has created a need for a practical means for simulating such celestial radiation particularly for testing tracking instruments.

One object of the present invention is to provide a system and apparatus for simulating starlight and skylight.

Another object is to provide a system and apparatus for testing tracking instruments.

Another object is to provide means for changing the position of a simulated star by small measurable angles.

Other objects will become apparent in the course of the following specification.

The objects of the present invention may be realized by providing a light source coupled with means for forming a starlight superposed on a skylight background and means for changing the position of the star by small measurable angles.

In the drawings, the single figure is a plan view of one embodiment of the present invention.

The present invention will appear more clearly from the following detailed description when taken in connection with the accompanying drawing showing, by way of example, one embodiment of the inventive idea.

In the figure, simulator 10 comprises a housing 11 within which is mounted a light source 20, a first optical system 30 for producing a starlight beam, and a second optical system 50 for producing a skylight beam upon which the starlight beam may be superposed. Simulator 10 also includes an eyepiece system 80 for viewing the starlight image, thereby providing autocollimating capabilities. An auxiliary autocollimator 90 is provided for measuring the tilt of an adjustable mirror 40 in optical system 30, which mirror 40 is used to change the angular position of the star in the skylight background.

The light source 20 may be a 75-watt xenon arc lamp which is operated at about 150 candles per square millimeter or less than the maximum brightness. It may be operated in either a horizontal or vertical attitude when properly cooled. A blower and cooling duct may be provided. Furthermore, the voltage may be gradually increased to compensate for blackening of the arc envelope during use. Operation at less than rated input with a well-regulated power supply provides constant stellar magnitude values that do not change by more than ±5% over 500 hours of continuous operation.

In first optical system 30, two condenser lenses 31 and 35 are optically aligned with light source 20 to focus the bright region of source 20 onto an optical fiber 36 supported on the surface of beamsplitter 37 by means of plate 38. An attenuator 32 and two filters 33 and 34 are shown schematically mounted between condensing lenses 31 and 35.

The filters 33 and 34, which may be multi-layer films or other filtrate media, shape the output of source 20 to correspond to that of the spectral shape of the desired star over the desired spectral band.

The attenuator 32 provides step-wise flux density control for desired stellar magnitudes. For example, where magnitudes of 0.2, 1.2, 2.2, and 3.2 are desired, a single attenuator disc having four detent positions is used to place the required cross grid pattern across the beam path. The desired 3.0 magnitude range requires a range of attenuation of $10^{1.2}$ or 16 which is not difficult to obtain in this manner.

The pinhole fiber 36 with a diameter of four microns is held in a glass plate 38 cemented to the quartz beamsplitter 37. In order to improve the sharpness of the image of the pinhole, the short length of quartz fiber 36 is potted in a hole in the glass plate 38 with opaque epoxy resin. An evaporated coating of chrome makes the rest of the glass plate 38 opaque.

A beam from source 20 is thus attenuated and filtered before it is focused on the potted fiber 36 at the focal plane of a reflecting objective 41 on beamsplitter 37. The incident beam reflects from the beamsplitting surface of beamsplitter 37 and passes through the center of adjustable mirror 40 to reflecting objective 41 which collimates and reflects the beam. The reflected beam is directed to translucent pellicle 55 by adjustable mirror 40.

Pellicle 55 is translucent and partially reflective. Thus the starlight coming through the pellicle 55 is merged with or superposed on the skylight background directed to one surface of the partially reflective pellicle 55. The starlight superposed on the skylight background is directed through the opening 12 of housing 11.

The collimating reflecting objective 41 has a 3.5″ aperture which is diffraction limited for the four-second star image size. This assures that 84% of the energy over this spectral range falls within the central disc of the Airy diffraction pattern.

The alignment stability of the star beam depends upon maintaining the relative positions of the reflecting objective 41, mirror 40, and beamsplitter 37. These are all mounted in a stable manner to the housing 11 to provide stability of two arc seconds under controlled temperature conditions.

In optical system 50, light from source 20 illuminates the diffusing opal disc 51. In order to get light from the surface from as large a solid angle as possible, disc 51 is cemented to the flattened surface of a fused quartz sphere 52. The circular image lies approximately at the aplanatic surface of the sphere 52 at a distance of $R/N$ from the center where R is the radius of the sphere and N is the index of refraction of the glass. Collector lenses 53 and 54 cast a real image of this circle just inside the periphery of field lens 58. Refracting objective lens 59 then collimates this light and directs it to pellicle 55 via reflector 60 with a diameter of 3.5″ or wide enough to fit the entrance pupil of the star tracker to be tested. Field lens 58 images collector 54 on objective lens 59. The system provides uniformity for the skylight background.

Filters 55 and 56 and attenuator 57 are placed between lens 54 and field lens 58. The attenuator 57 comprises cross variable density grid patterns on a circular disc with detent positions including one for blackout. A visual brightness scale may be provided on the attenuator disc.

The attenuator 57 is rotably mounted at a point where the rays have little correlation with the rays through any region or solid angle. For a sky field of three degrees, the illuminated area at the field lens 58 has a radius of about 0.026$f$ inch, where $f$ is the focal length of the objective 59. With a magnification of two in the field lenses, the diameter of the diffusing disc must be 0.013$f$ inch. The focal length of the objective 59 is selected as part of the optical design.

Except for transmission losses, the brightness is nearly equivalent to the brightness at the diffusing disc 51. This surface is placed at 1.5 centimeters from the 150 candle xenon arc. This gives an illumination of about 67 lumens per square centimeter. About 40% of this flux is re-radiated in a lambertian manner into the quartz sphere, and the brightness is about 8.4 candles per square centimeter.

Assuming the maximum required sky brightness were about 200-foot-lamberts or 64 candles per square foot, which equals 0.00058 candle per square centimeter, an adequate total attenuation factor of 0.0007 is allowed for filtering to approximate the spectral shape of the sky, attenuation by the combining pellicle 55, and attenuation by the remaining optics.

When a mirror is held in front of opening 12 of simulator 10 with the sky attenuator 57 turned to the blackout position, an image of the star is visible through eyepiece 81 of system 80. In order to measure the angle between the star beam and the normal external mirror, the mirror 40 is tilted by means of adjusting screws 42 to bring the autocollimated image into the centered condition on a reticle image 43 provided on the surface of the beamsplitter 37. By using filar micrometers (only one shown as 91) of the autocollimator 90, a reading of this angle accurate to two arc seconds may be made by autocollimating off the back of the tilted mirror 40 by means of reflector 92 and collimating lens 93.

The autocollimator 90 may also be used to project the star to different positions in a field of view of a telescope. The desired angular position coordinates are set into the micrometers of the autocollimator 90 and then the mirror 40 is tilted to restore autocollimation alignment as seen in the eyepiece of the autocollimator 90. Any desired position coordinates may be used.

It is apparent that the described example is capable of many variations and modifications. All such variations and modifications are to be included within the scope of the present invention.

What is claimed is:
1. A star and skylight simulator for use in checking the operation of a star tracker or the like comprising:
   (a) a light source;
   (b) means for constricting a portion of light from said source to form a point light source of uniform intensity;
   (c) a first optical system arranged to collimate light from said point light source and project said collimated light in a first beam;
   (d) means for angularly displacing said first projected collimated beam;
   (e) means for diffusing another portion of light from said source to form a source of diffused light of uniform intensity; and
   (f) a second optical system arranged to gather light from said diffused light source and project said light in the form of a field of light having within it said beam from said first optical system;
   (g) whereby a tracker when arranged to view the projected light sees a displaceable point of light within a background of diffuse illumination.

2. A star and sky simulator according to claim 1 wherein said first and second optical systems include a common partially-transmissive reflector arranged to transmit the light beam projected by one of said systems and to reflect the light beam projected by the other of said systems into coincidence with said transmitted beam, thereby providing a composite projected beam consisting of the light from each of said systems.

3. A star and sky simulator according to claim 1 wherein said means for angularly displacing said first beam is a reflector and including autocollimating alignment means for determining the position of said beam-displacing means, thereby providing a determination of the degree of angular displacement of said first collimated beam.

4. A star and sky simulator according to claim 1 wherein said first and second optical systems include independently variable light intensity attenuating means, thereby providing means for faithfully reproducing natural variations in the ratio of starlight to skylight brightnesses.

References Cited

UNITED STATES PATENTS

| | | | |
|---|---|---|---|
| 2,483,216 | 9/1949 | Marshall | 35—43 XR |
| 2,827,827 | 3/1958 | Spitz | 35—43 XR |
| 2,827,829 | 3/1958 | Spitz et al. | 88—24 |
| 3,290,986 | 12/1966 | Woehl | 88—14 |

JEWELL H. PEDERSEN, *Primary Examiner.*

O. B. CHEW, *Assistant Examiner.*